United States Patent [19]

Komarek

[11] 4,363,686
[45] Dec. 14, 1982

[54] PROCESS FOR THE PRODUCTION OF IMITATION SUEDES BY THE REVERSAL PROCESS

[75] Inventor: Ernst Komarek, Leverkusen, Fed. Rep. of Germany

[73] Assignee: Bayer Aktiengesellschaft, Leverkusen, Fed. Rep. of Germany

[21] Appl. No.: 229,813

[22] Filed: Jan. 30, 1981

[30] Foreign Application Priority Data

Feb. 6, 1980 [DE] Fed. Rep. of Germany ....... 3004327

[51] Int. Cl.$^3$ .............................................. B29C 13/00
[52] U.S. Cl. .................................... 156/242; 156/246; 524/731; 428/85; 428/86; 428/96; 428/97; 528/45; 528/48
[58] Field of Search ............... 156/242, 243, 245, 246; 428/85, 86, 96, 97; 525/330; 528/45, 48

[56] References Cited

U.S. PATENT DOCUMENTS

| | | | |
|---|---|---|---|
| 3,267,078 | 8/1966 | Damusis | 427/385.5 |
| 3,369,949 | 2/1968 | Forrest | 156/232 |
| 3,533,895 | 10/1970 | Norcross | 428/85 |
| 3,583,943 | 6/1971 | Weber et al. | 260/75 |
| 3,655,497 | 4/1972 | Forrest | 428/97 |
| 3,678,011 | 7/1972 | Hino et al. | 156/246 |
| 3,755,261 | 8/1973 | Van Gulick | 525/330 |
| 3,770,703 | 11/1973 | Gruber et al. | 528/48 |
| 3,861,937 | 1/1975 | Hanneken et al. | 428/151 |
| 3,900,688 | 8/1975 | Thoma et al. | 428/246 |
| 3,984,607 | 10/1976 | Thoma et al. | 156/246 |
| 4,071,390 | 1/1978 | Strassel | 156/246 |
| 4,124,428 | 11/1978 | Forrest | 156/246 |
| 4,248,756 | 2/1981 | Konig et al. | 260/31.2 N |

FOREIGN PATENT DOCUMENTS 1085454 11/1965 United Kingdom .
1085455 11/1965 United Kingdom .

*Primary Examiner*—Caleb Weston
*Attorney, Agent, or Firm*—Gene Harsh; Lawrence S. Pope; Thomas W. Roy

[57] ABSTRACT

Process for the production of sheet products having a suede-like surface by application of a coating paste to a matrix whose surface has the structure of a negative of suede or suede-like materials, solidification of the coating by heating, stripping of the solidified coating from the matrix and, optionally, laminating it to a textile material, characterized in that:

(a) a coating paste of a two-component system which does not harden to a polyurethane urea until heated, which system is based either on a blocked isocyanate prepolymer and a polyamine or on an isocyanate prepolymer and a complex of an alkali metal halide and an aromatic polyamine and, optionally, up to about 40% by weight, preferably less than about 30% by weight, more preferably less than about 25% by weight, and most preferably less than about 15% by weight, of solvent, so that the coating paste has a viscosity of at the most about 100,000 mPa.s at room temperature, is applied;

(b) the coating is heated to a temperature of from about 30° to 80° C., the viscosity of the coating paste passing through a minimum which is at the most about 30,000 mPa.s; and (c) the coating is hardened to the polyurethane urea by heating to a temperature above about 90° C.

8 Claims, 1 Drawing Figure

PROCESS FOR THE PRODUCTION OF IMITATION SUEDES BY THE REVERSAL PROCESS

BACKGROUND OF THE INVENTION

1. Field of the Invention

This invention relates to a process for the production of materials resembling suede, using coating compounds which may be cross-linked to high molecular weight products at elevated temperatures and which, by virtue of the particular variation of the viscosity thereof with temperature, are particularly suitable for the reversal coating of matrices which have exceptionally deep and narrow depressions. The sheets obtained after removal of the coating from the matrix have long fibers projecting from the surface so that they are particularly suitable for use as suede imitations.

2. Description of the Prior Art

It is known to coat various types of matrices with thermoplastic resins by spraying or by application using a doctor knife and subsequently removing the coatings from the matrix after evaporation of any solvents used or, in the case of reactive systems, after the hardening reaction. The thus-obtained coatings carry a negative reproduction of the surface of the matrix.

Suitable matrix materials include, for example, the conventional embossed separating papers having surfaces of, for example, polypropylene or silicone, metals, silicone rubber compounds or polyester resin compounds.

The coating systems used are preferably thermoplastic compounds, polyurethanes dissolved in solvents and capable of being cross-linked, e.g. with polyisocyanates or melamine resins, PVC compounds which may contain varying amounts of plasticizer, polyamides, etc. (U.S. Pat. No. 3,861,937).

Blocked two-component reactive systems have also been described for the conventional coatings, for example, in U.S. Pat. No. 3,755,261, there is described the amine-hardening of polymers or prepolymers based on urethanes having isocyanate end groups, on epoxy resins or on halogen-containing hydrocarbon polymers, etc., using finely divided complexes of certain aromatic diamines and salts, such as NaCl.

Isocyanate prepolymers blocked with the conventional blocking agents are also known, e.g., according to German Offenlegungsschrift No. 2,131,299 (U.S. Pat. No. 3,770,703), isocyanate prepolymers blocked with caprolactam, or prepolymers blocked with malonic dialkyl esters. Ketoxime-blocked isocyanate prepolymers which are subsequently cross-linked with polyols containing tertiary amine groups have also been described in German Offenlegungsschrift No. 1,621,910 for the advantageous characteristics thereof compared with phenol-blocked isocyanate prepolymers.

According to German Offenlegungsschrift No. 1,519,432 (U.S. Pat. No. 3,267,078), ketoxime-blocked isocyanate prepolymers are mixed with polyketimines (i.e., polyamines blocked with ketones) which harden at room temperature in the presence of moisture.

In British Pat. No. 1,085,454, there are described ketoxime-blocked isocyanate prepolymers with aliphatic diamines for the production of abrasion-resistant coatings or impregnations of nonwovens, leather and wood.

Although these described reactive systems are generally known in the use thereof for the production of coatings, they have not been described for the production of imitation suedes nor are the particular conditions required for producing such imitation suedes known. Solvent-free coatings are obtained from foils of thermoplastic resins which soften when heated so that they fill up the depressions in the matrices. The polymer solidifies on cooling so that a negative reproduction of the matrix is obtained on the surface of the foil.

The matrices described are generally used to imitate surfaces of the type commonly found in grained leather, although they are, of course, also able to reproduce other patterns such as textile structures, etc. It is particularly difficult, however, to produce suede imitations by these means. Matrices which have been taken from genuine suede or from flocked suede-like materials are distinguished by having exceptionally narrow and deep depressions which enable the long hairs or fibers of a suede to be reproduced. In U.S. Pat. No. 3,533,895, foils of soluble thermoplastic polyurethane elastomers are impressed into silicone matrices at high temperatures and pressures. The products, however, must not be separated from the matrix until they have cooled and the nap thereof is very sensitive to pressure for from 1 to 2 days, as well as the products being very sensitive to solvents.

So it was tried to get an improved thermostability by aftertreatment of such soluble polyurethane leathers by spraying with diluted solutions of polymer isocyanates, drying at 80° C. and standing three days at room temperature (German utility model DGBM No. 7 141 380). However, this procedure is complicated and lengthy and, due to the use of solvents, results in environmental pollution.

The production of matrices and the use thereof in reversal coating processes is known. They have been described, for example, in U.S. Pat. Nos. 3,369,949; 3,655,497 and 4,124,428 and in German Offenlegungsschrift No. 1,933,255. One difficulty of the process, however, is that high molecular weight thermoplastic products generally do not enter the narrow depressions of such matrices sufficiently completely. If, on the other hand, low viscosity solutions of polymers are used, these solutions will readily enter the deep depressions, but faulty areas are formed as the solvent evaporates so that the attractive character of the suede is not perfectly reproduced. These faulty areas are subsequently fixed by the increase in viscosity with resulting film formation which occurs at the same time.

Similarly unsatisfactory results are obtained from the reaction of deblocked polyurethane reactive systems, even if they have a high solids content, e.g., of 67% by weight and, here again, the formation of a nap is impaired and the structure of the polyurethane suede is not sufficiently stable for removal from the matrix. The polyurethane obviously fails to penetrate sufficiently completely into the fine capillaries and fine velour hairs stick and break off as the polyurethane is separated from the matrix.

On the basis of these results, it was to be expected that high solids reactive systems obtained from blocked starting materials would give rise to similar difficulties on separation of the reactive polyurethanes after they have hardened inside the fine capillaries of the matrix.

It has surprisingly been found, however, that if the conditions according to the present invention are observed, the systems chosen according to the present invention are not only capable of reproducing the finest details in the matrix (such as very fine suede hairs) but also enable the polyurethane urea to be readily stripped from the matrix after polyurethane formation from the reactive systems has been completed within the matrix. These systems are based on blocked polyurethane starting components which do not harden to a solvent-resistant polyurethane urea until heated and are preferably cross-linked after the heat treatment. In addition to the detailed and accurate reproduction of the matrix and the ease with which the product may be stripped from the matrix, the procedure according to the present invention ensures that the back of the polyurethane suede material is homogeneous and of uniform thickness.

However, before the onset of cross-linking, if the viscosity minimum within the temperature range of 30° to 80° C. is not observed, but instead, for example, the temperature is immediately raised to high furnace temperatures such as 170° C., the same materials will give rise to unhomogeneous suede coatings full of blisters and crater-like depressions.

SUMMARY OF THE INVENTION

The present invention thus relates to a process for the production of sheet products having a suede-like surface by application of a coating paste to a matrix whose surface is constructed as the negative of a suede or suede-like material, solidification of the coating by heating, stripping of the solidified coating from the matrix and, optionally, laminating of the coating to a textile support material, characterized in that:

(a) a coating paste of a two-component system which may only be hardened to a polyurethane urea by heating, which system is based either on a blocked isocyanate prepolymer and a polyamine or on an isocyanate prepolymer and a complex of an alkali metal halide and an aromatic polyamine and, optionally, up to about 40% by weight, preferably less than about 30% by weight, more preferably less than about 25% by weight, and most preferably less than about 15% by weight, of solvents so that the coating paste has a viscosity of at the most about 100,000 mPa.s at room temperature, is applied;

(b) the coating is heated to a temperature of from about 30° to 80° C., the viscosity of the coating paste passing through a minimum which is at the most about 30,000 mPa.s; and (c) the coating is hardened to the polyurethane by heating to a temperature above about 90° C.

Coating compounds based on blocked, heat-hardenable polyurethane two-component systems which fulfill the following conditions are particularly suitable:

(d) the coating compounds must have a viscosity at room temperature (from about 17° to 25° C.) of at the most about 100,000 mPa.s, preferably from about 5,000 to 70,000 mPa.s;

(e) when heated to temperatures of from about 30° to 80° C., the compounds should pass through a viscosity minimum of at the most about 30,000, preferably less than about 15,000, most preferably from about 100 to 10,000 mPa.s;

(f) the solvent content of the coating compounds should be as low as possible in order to avoid faults in the formation of the surface; the solvent content should, as far as possible, not exceed 30% by weight, and should preferably be below about 25%, more preferably below about 15% (when using higher viscosity starting compounds, such as NCO-prepolymers prepared with aliphatic diisocyanates, the solvent content may be higher, for example, up to about 40% by weight);

(g) within the temperature range indicated above in which the viscosity passes through a minimum and the coating compound penetrates the depressions of the matrix, no significant cross-linking reaction with formation of high molecular weight products should yet occur in the coating system.

DETAILED DESCRIPTION OF THE INVENTION

Figure 1:
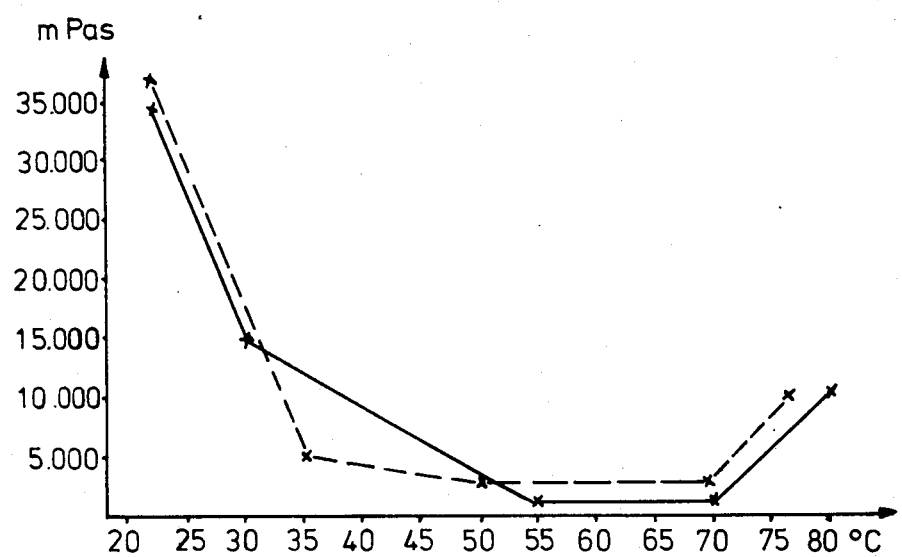
FIG. 1 is a graph showing the relationship between viscosity (ordinate) and temperature (abscissa) for the coating materials of the subject invention.

The temperature at which cross-linking begins is easily recognized from a rise in viscosity as the variation of viscosity is followed in dependence upon temperature. As the temperature rises further above the viscosity minimum to the temperature of optimum cross-linking, the coating compounds react to form solid high molecular weight products. This final cross-linking in most cases does not proceed sufficiently rapidly until temperatures above about 90° C. are reached, preferably temperatures of from about 100° to 180° C., more preferably from about 100° to 150° C., and it is only in the less reactive systems based on aliphatic polyisocyanates that the corresponding temperature range is from about 150° to 180° C., for short reaction times of less than five minutes.

The polyurethane reactive systems according to the present invention which have high solids contents amounting to above about 60% by weight, preferably above about 70% by weight, more preferably above about 75% by weight, most preferably above about 85% by weight and in which the reactive groups must be blocked so that synthesis reactions do not take place to any significant extent at or below about 90° C. and which, in addition, must obey a certain relationship of viscosity to temperature, have provided the possibility of a faultless and highly accurate reproduction of suede-like matrices so that a high quality material resembling suede may be obtained by casting. Apart from using very high solids concentrations, it was necessary, in order to achieve this object, that these blocked polyurethane reactive systems should, starting from a suitable viscosity for spread coating, first pass through a viscosity minimum when heated to from about 30° to 80° C. and completely fill the matrix at this low viscosity before cross-linking at the higher temperatures (see viscosity curves relating to the Examples). No such procedure could be found in any of the literature cited.

If polyurethane reactive coatings are used in which none of the reactants are inhibited in the reactivity thereof by blocking, the coatings obtained do not fully satisfy the requirements. A coating compound of deblocked isocyanate prepolymers and free amines as cross-linking agents, for example, also gives rise to a product having a suede-like nap, but its surface is severely disturbed. It is generally necessary to add considerable quantities of solvent to such compounds in order to lower the initial viscosity thereof. Owing to the high reactivity of the two components, mixing must generally be carried out in a two-component mixing head, and the reactive mixture is generally applied by spraying, which inevitably introduces an undesirable quantity of air bubbles into the coating compound.

Moreover, the reaction begins as soon as the reactants have been mixed and consequently even while the mixture is being applied to the matrix, viscosity rapidly rises. As the coating compound flows into the deep depressions of the matrix, cross-linking already takes place, which prevents escape of the air contained in the depressions and of the solvents in the coating compound and leads to rapid film formation. The surface of the coating is, therefore, inferior due to less accurate reproduction of the form of the matrix.

The process according to the present invention for the production of a sheet product having a surface resembling suede may, for example, be carried out in accordance with the following scheme: The coating material is applied at room temperature to a matrix of the type described above (preferably a matrix according to U.S. Pat. No. 3,369,949 or German Offenlegungsschrift No. 1,933,255) by spread coating, using a conventional spread coating device. The coating material is then heated to the temperature at which it passes through its viscosity minimum without cross-linking, for example by exposing the coated matrix to conventional thermal radiators or by passing it through a heating channel of the type conventionally used in the coating industry. The coating is then raised to a temperature at which the hardening reaction takes place, for example by exposure to more intensive heat from the radiators or by introduction of the coated matrix into a hotter heating channel.

This procedure of spread coating, lowering of viscosity and subsequent cross-linking with evaporation of solvents may be carried out once or repeatedly. After cooling, the completed coating is removed from the matrix and, if necessary, its appearance and general characteristics are slightly corrected by a suitable after-treatment.

The following are examples of coating materials which will satisfy the requirements according to the present invention.

(1) Isocyanate prepolymers which have been blocked with conventional blocking agents and are to be cross-linked with polyamines. The systems may contain from about 0 to 40% by weight of solvents which may also serve as levelling agents. Deblocking of the masked isocyanates and the hardening reaction with amines thereby released take place within a few minutes if the coating is heated to temperatures above about 100° C., preferably above about 140° C.

(2) Mixtures of isocyanate prepolymers with a complex of alkali metal halides and aromatic polyamines, e.g., the sodium chloride complex of 4,4′-diaminodiphenylmethane, such as those described in U.S. Pat. No. 3,755,261. The complex decomposes at about 120° C. into free sodium chloride and free amine, and the amine liberated subsequently reacts with the isocyanate groups of the isocyanate prepolymer to form a high molecular weight product. A certain amount of solvent may be added when using these coating materials to regulate the viscosity of the coating material as it is applied to the matrix.

Coating materials of the first-mentioned type are preferred for the present process. Thermosetting two-component systems containing the following essential components have been found to be particularly suitable:

(A) a prepolymer having an average molecular weight of from about 1,000 to 15,000, preferably from about 2,000 to 8,000, having an average of from about 2 to 4, preferably from about 2 to 3, ketoxime-blocked aromatic isocyanate groups;

(B) a cross-linking agent corresponding to the following general formula:

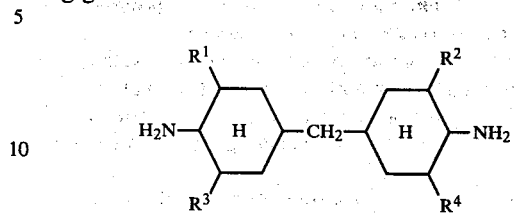

wherein $R^1$, $R^2$, $R^3$ and $R^4$ independently represent hydrogen or a $C_1$–$C_3$ alkyl group, provided that at least about 75% of the diamine consists of the cis,cis-isomer if $R^1$ to $R^4$ all represent hydrogen; and optionally (C) pigments, fillers, blowing agents and other known additives; wherein the equivalent ratio of blocked isocyanate groups to $NH_2$ groups is from about 1.35:1 to 0.95:1, preferably from about 1.25:1 to 1:1.

The isocyanates used for producing the isocyanate prepolymers which are optionally converted into ketoxime-blocked isocyanate prepolymers are preferably aromatic polyisocyanates of the type described in some detail in U.S. Pat. Nos. 3,984,607 and 4,035,213, German Offenlegungsschrift No. 2,402,840 and German Auslegeschrift No. 2,557,387. 2,4′- and 4,4′-diisocyanato-diphenylmethane, the isomeric tolylene diisocyanates and, in particular, mixtures of these diisocyanates are preferred according to the present invention. Aliphatic and cycloaliphatic diisocyanates, such as hexamethylene diisocyante, dicyclohexylmethane-4,4′-diisocyanate and isophorone diisocyanate (IPDI) may also be used.

The active hydrogen-containing reactants used to prepare the isocyanate prepolymers may be polyhydroxyl compounds having from about 2 to 8, preferably from about 2 to 3, hydroxyl groups and a molecular weight of from about 500 to 10,000, preferably from about 1,000 to 6,000, such as those also described in detail in the above-mentioned references.

Preferred reactants include propylene oxide polyethers having an average of two to three hydroxyl groups and, optionally also containing polyethylene oxide units, and hydroxyl polyesters having melting points below about 60° C. which have 2 or 3 OH end groups and an average molecular weight of from about 1,000 to 6,000.

Mixtures of the above-mentioned hydroxy-polyethers with hydroxypolyesters of adipic acid, hexane-1,6-diol and neopentylglycol having average molecular weights of from about 1,000 to 3,000 are particularly preferred.

Low molecular weight polyols having molecular weights below about 300, of the type known for use as chain-lengthening agents, may also be used in the preparation of the isocyanate prepolymers. Compounds of this type which are preferred for the purposes of the present invention are butane-1,4-diol, di-(2-hydroxyethyl)-methylamine and trimethylolpropane.

Preparation of the isocyanate prepolymers is carried out in known manner by reacting the above-mentioned polyhydroxyl compounds with excess aromatic and/or (cyclo)aliphatic polyisocyanates, preferably diisocyanates, at from about 70° to 110° C. The NCO/OH ratio chosen for this reaction is generally from about 1.5:1 to 6.0:1, preferably from about 1.7:1 to 2.5:1.

The blocking agents used for the isocyanate prepolymers may be, for example, ketoximes of hydroxylamine and ketones, such as acetone, methyl ethyl ketone, diethyl ketone, cyclohexanone, acetophonone and benzophenone.

A preferred blocking agent for these polymers is methyl ethyl ketoxime (butanone oxime).

The blocking reaction is carried out by reacting the isocyanate prepolymer with stoichiometric quantities of the ketoxime at elevated temperatures, e.g., from about 70° to 100° C., until the isocyanate groups have disappeared.

Other conventional blocking agents, such as phenol, caprolactam or malonic acid esters, may also be used, either together with other blocking agents or alone, although the use of these agents is less preferred. Blocked isocyanate prepolymers in which not all the free isocyanate groups are converted into the blocked form, but only about 75% thereof, preferably more than about 90% thereof, may also be used.

The blocked isocyanate prepolymers may be mixed with small quantities of organic solvents to adjust them to the optimum processing viscosity of from about 5,000 to 70,000 mPa.s at about 20° C. Owing to the blocked character of the isocyanate groups, the solvents used need not necessarily be inert towards isocyanate groups. Examples of suitable solvents include: isopropanol, ethylene glycol monomethyl ether and ethylene glycol monoethyl ether and the acetic acid esters thereof, methyl ethyl ketone, cyclohexanone, butyl acetate and DMF.

The cross-linking component (B) used according to the present invention for the blocked isocyanate prepolymers is preferably 4,4'-diamino-3,3'-dimethyl-dicyclohexylmethane, an aliphatic diamine having very low vapor pressure which is liquid at room temperature and gives rise to an excellent suede leather having a dry handle and great stability of the nap.

Other suitable cross-linking agents include, for example, the homologous 3,3'-diethyl-, dipropyl- and diisopropyl derivatives, 4,4'-diamino-3,3',5,5'-tetramethyl-dicyclohexylmethane and the homologous tetraethyl derivative, 4,4'-diamino-3,5-dimethyl-3',5'-diethyl-dicyclohexylmethane and other aliphatic and cycloaliphatic diamines, preferably having a lower vapor pressure than 1,6-hexanediamine.

Mixing of the blocked isocyanate prepolymers with the diamine cross-linking agents is generally carried out using approximately equivalent weights of these components, although, for some purposes of application, it is suitable to carry out incomplete cross-linking so that the equivalent ratio of blocked NCO to $NH_2$ according to the present invention is generally from about 1.35:1 to 0.95:1, preferably from about 1.25:1 to 1:1.

Known additives, such as pigments, UV stabilizers, light-protective agents, phenolic antioxidants, tert. amine stabilizers, fillers, 2,2,6,6-tetramethylpiperidine derivatives, blowing agents, levelling agents, such as silicone oils or, for example, organofunctional polydimethyl siloxanes, may be added to the thermosetting reactive mixtures to produce the coating materials ready for use.

The thermosetting reactive mixtures may be used to produce coatings in any of the conventional reversal coating installations.

The following Examples serve to illustrate the present invention.

EXAMPLES

EXAMPLE 1

(a) Preparation of a blocked isocyanate prepolymer 2,000 g of a polyether based on trimethylolpropane and propylene oxide having a molecular weight of 6,000 to 1,000 g of a linear polyether based on propylene glycol and propylene oxide having a molecular weight of 1,000, 1,450 g of a linear polyester of hexane-1,6-diol, neopentylglycol and adipic acid (molecular weight 1,700) and 22.5 g of butane-1,4-diol are reacted with 1,125 g of 4,4'-diisocyanato-diphenylmethane and 174 g of 2,4-diisocyanato-toluene at from 80° to 90° C. for about three hours until the isocyanate content is just below the calculated isocyanate content of 4.26% by weight. 496 g of butanone oxime and 696 g of ethylene glycol monomethylether acetate are then rapidly stirred in at from 60° to 70° C. No more isocyanate is detectable in the IR spectrum after 20 minutes. The blocked isocyanate prepolymer, a clear, colorless liquid having a viscosity of about 40,000 mPa.s at 20° C., has a determinable latent isocyanate content of 3.3% by weight and, hence, an isocyanate equivalent of 1,280.

(b) Process according to the present invention 1,280 g of the prepolymer are mixed with 119 g (i.e., an equivolar quantity) of 4,4'-diamino-3,3'-dimethyl-dicyclohexylmethane. 10% by weight (based on the total mixture) of a commercial pigment trituration and 1% by weight of silicone oil are also added. The viscosity of the resulting paste which is ready for use is about 40,000 mPa.s at room temperature.

The coating material is applied by knife coating to a matrix prepared according to U.S. Pat. No. 4,124,428 to form thereon a coating of about 200 g/m². The coated matrix is then passed at a rate of about 9 m/min. through a heating channel 9 m in length which is heated to an air temperature of 80° C. After passing through this first heating channel, the coated matrix is passed through a second channel at the same velocity. This heating channel is 18 m in length and is maintained at a temperature of 170° C. After cooling, the coating is removed from the matrix and reinforced by bonding it with either a cotton fabric which is napped on one side or with a mixed polyester-cotton fabric weighting about 190 g/m². This laminate is formed by placing the smooth side of the coating in contact with the smooth side of the fabric, using a commercial polyurethane one-component system.

The suede effect is enhanced by brushing the surface, using the conventional brushing and cleaning machines used in the textile industry. The suede may be stabilized and improved in its use properties by known auxiliary and finishing processes. A textile having a suede finish is thereby obtained which may be used, for example, for the production of shoes and clothing purposes. This material has surprisingly been found to have a permeability to water vapor of from 0.5 to 1.5 mg/cm²/h, determined according to IUP 15. These values may be influenced and, in part, even exceeded by varying the solvent added.

EXAMPLE 2

The coating material described in Example 1 is again applied to a matrix according to U.S. Pat. No. 4,124,428 in the conventional manner. The coated matrix is passed through a drying channel 18 m in length at a rate of 5 m per minute. The channel is heated stepwise from 40° C. to 160° C. The coating paste passes through its viscosity minimum in the first part of the drying channel, while the cross-linking reaction takes place in the second part. The matrix is removed after the coating has cooled. The resulting polyurethane film having a suede-like surface is bonded on its smooth surface to a smooth, unnapped cotton or polyester/cotton or polyester fabric, using a conventional pressure-sensitive adhesive dissolved in solvents. The use of properties may be influenced and improved by brushing and after-treatments, as described in Example 1.

The suede-like material may be used, for example, for the production of upholstery covers.

EXAMPLE 3

A coating compound as described in Example 1 of U.S. Pat. No. 3,755,261 is applied by knife coating to the matrix used in Example 1, and the coated matrix is heated as described in Example 2, but with the last zone of the channel maintained at a temperature of only 140° C.

After removal of the cooled coating from the matrix, the coating is bonded with textile and treated as described in Example 1.

The variation of viscosity with temperature of the coating materials used in the Examples is illustrated in FIG. 1. The solid line represents the paste of Examples 1 and 2 and the dash-dot line that of Example 3.

EXAMPLE 4

An NCO-prepolymer is prepared as in Example 1 and blocked, however, with 655 g caprolactam. Subsequently, 645 g of ethyleneglycol monomethylether acetate will be stirred in quickly. After 30 minutes, no NCO is detectable by IR spectroscopy. The blocked prepolymer, a whitish, dull fluid with a viscosity of 50,000 mPa.s at 20° C., has a latent NCO-content of 3.2% by weight and an NCO-equivalent weight of 1,310.

Before spreading of the whitish, dull, inhomogeneous, semolina-like product, it is necessary to homogenize the product by warming it up to 40° to 50° C.

As described in Example 1, the coating mass is brought onto a mold and is passed through a first heating channel at 90° C. air temperature with a band velocity of about 7 m per minute. After passage of the first heating channel, the coated mold is led through a second channel at a temperature of 190° C. with the same velocity. The coating is further treated as described in Example 1.

The outcoming coating of Example 4 is similar to Example 1 and is free of air-enclosure also on the backside. The physical properties are comparable. The stability against alcoholic solutions, such as alcoholic drinks of high alcohol content, is generally as good as it is in the leather coatings according to Example 1, although somewhat less than in Examples 1 to 3.

EXAMPLE 5

An NCO-prepolymer is prepared as in Example 1 and blocked, however, with 1,005 g malonicester (malonic acid-diethylester). Subsequently, 675 g ethylene glycol monomethylether acetate is stirred in quickly. After 30 minutes, no more NCO is detectable by IR spectroscopy. The blocked NCO-prepolymer, a colorless, clear liquid with a viscosity of 43,000 mPa.s at 20° C., has a detectable latent NCO-content of 3.0% by weight and an equivalent weight of 1,400. It is processed further as in Example 1.

The resulting coating is comparable with respect to the homogeneity of the coatings of Example 1. The suede-like surface is somewhat softer and gives a more pleasant feeling but, in abrasion resistance and scratching resistance, however, it is somewhat inferior. The stability against alcoholic drinks with high percent alcohol content is good and, further, in solvents such as methylethylacetone, the substrate is insoluble.

The suede leathers produced according to Examples 1, 4 and 5 of the invention, starting from blocked, high solid systems, show a soft, long pile which can be brushed in different directions, a property known from natural suede leather.

However, when using solutions of polyurethanes with low solid content according to the prior art, short, bristly, low pile suede leathers of poor quality are obtained which do not have the sheen effect associated with natural suede leathers or the suede leathers produced according to Examples 1 to 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of sheet products having a suede-like surface by applying a coating paste to a matrix whose surface has the form of a negative of suede or suede-like materials, solidifying the coating by heating, and removing the solidified coating from the matrix, comprising:
    (a) applying a coating paste of a two-component system which may be hardened to a polyurethane urea only when heated and which is based on
        (1) a blocked isocyanate prepolymer and a polyamine or
        (2) an isocyanate prepolymer and a complex of an alkali metal halide and an aromatic polyamine and
    up to about 40% by weight of solvent so that the coating paste has a viscosity of at most about 100,000 mPa.s at room temperature;
    (b) heating the coating to a temperature of from 30° to 80° C., the viscosity of the coating paste passing through a minimum which is at the most 30,000 mPa.s; and
    (c) hardening the coating to the polyurethane by heating to a temperature above 90° C.

2. A process according to claim 1, characterized in that the coating paste comprises:
    (a) a prepolymer having an average molecular weight of from about 1,000 to 15,000 having an average of from about 2 to 4 ketoxime-blocked aromatic isocyanate groups; and
    (b) a cross-linking agent corresponding to the following general formula:

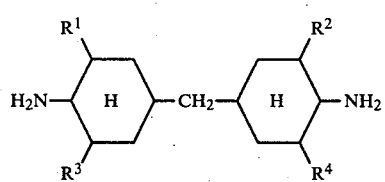

wherein $R^1$, $R^2$, $R^3$ and $R^4$ independently represent hydrogen or a $C_1$–$C_3$ alkyl group, provided that at least about 75% of the diamine consists of the cis, cis-isomer when $R^1$ to $R^4$ all represent hydrogen; the equivalent ratio of blocked isocyanate groups to $NH_2$ groups being from about 1.35:1 to 0.95:1.

3. The process according to claim 2, characterized in that component (a) has been prepared from a polyether having a molecular weight of from about 500 to 10,000 having an average of from 2 to 3 hydroxyl groups and/or a polyester having a molecular weight of from about 1,000 to 6,000 having an average of from 2 to 3 hydroxyl groups.

4. The process according to claim 2 or 3, characterized in that the compound used as component (b) is 4,4'-diamino-3,3'-dimethyldicyclohexylmethane.

5. The process according to claim 2 or 3, characterized in that silicone oils are additionally added.

6. The process according to claim 2 or 3, characterized in that the coating paste contains up to about 30% by weight of solvent.

7. The process according to claim 2 or 3 which comprises laminating the solidified coating to a textile substrate.

8. The process according to claim 2 or 3 which comprises adding a member selected from the group consisting of pigments, fillers and blowing agents.

* * * * *